United States Patent

Dodds et al.

Patent Number: 5,409,871
Date of Patent: Apr. 25, 1995

[54] CERAMIC MATERIAL FOR USE IN CASTING REACTIVE METALS

[75] Inventors: Gerald C. Dodds, Mentor; Ricky A. Alexander, Highland Heights, both of Ohio

[73] Assignee: PCC Airfoils, Inc., Cleveland, Ohio

[21] Appl. No.: 146,965

[22] Filed: Nov. 2, 1993

[51] Int. Cl.⁶ .............. C04B 35/10; C04B 35/44; C04B 35/505
[52] U.S. Cl. .................. 501/127; 501/152; 106/38.9; 106/38.27
[58] Field of Search .............. 501/152, 127; 106/38.9, 106/38.27

[56] References Cited

U.S. PATENT DOCUMENTS

| | | |
|---|---|---|
| 3,266,893 | 8/1966 | Duddy . |
| 4,040,845 | 8/1977 | Richerson et al. ............... 106/38.9 |
| 4,063,954 | 12/1977 | Brown ...................... 106/38.27 X |
| 4,097,291 | 6/1978 | Huseby et al. .................. 106/38.9 |
| 4,097,292 | 6/1978 | Huseby et al. .................. 106/38.9 |
| 4,108,672 | 8/1978 | Klug et al. ..................... 106/38.9 |
| 4,134,777 | 1/1979 | Borom ....................... 106/38.9 X |
| 4,156,614 | 5/1979 | Greskovich et al. ............. 106/38.9 |
| 4,164,424 | 8/1979 | Klug et al. .................... 106/38.9 |
| 4,196,769 | 4/1980 | Feagin ......................... 501/128 X |
| 4,331,627 | 5/1982 | Yamamoto et al. ............. 501/152 X |
| 4,837,187 | 6/1989 | Frank et al. .................... 501/127 |
| 4,966,875 | 10/1990 | Micheli et al. .................. 106/152 |
| 4,996,175 | 2/1991 | Sturuis ......................... 501/126 |
| 5,059,388 | 10/1991 | Kihara et al. . |

OTHER PUBLICATIONS

Reed "Introduction to the Principles of Ceramic Processing" 1988 (no month).

*Primary Examiner*—Mark L. Bell
*Assistant Examiner*—David Sample
*Attorney, Agent, or Firm*—Tarolli, Sundheim & Covell

[57] ABSTRACT

An improved sintered ceramic core is used in a mold during the casting of a reactive metal. Prior to sintering, the core contains ceramic material which includes yttrium aluminate and alumina ($Al_2O_3$). It is preferred to have the ceramic material contain between 10% and 40% yttrium aluminate. Prior to sintering, the yttrium aluminate has a mean particle size of less than 20 microns and, preferably, less than 10 microns. Particularly advantageous results has been obtained by using yttrium aluminate having a mean particle size, prior to sintering, of approximately 3 microns. It is contemplated that the ceramic material will be utilized to form other articles, such as a mold, filter, or liner for a ladle, which are exposed to reactive metals during casting.

5 Claims, 1 Drawing Sheet ary component of the core. The ceramic material

CERAMIC MATERIAL FOR USE IN CASTING REACTIVE METALS

BACKGROUND OF THE INVENTION

The present invention relates to forming an article having a surface which is exposed to a reactive metal during casting of the reactive metal.

During the casting of reactive metals, such as nickel-chrome superalloys, titanium, zirconium or alloys containing substantial amounts of tungsten, hafnium, carbon, nickel, etc., a reaction tends to occur between the alloy and surfaces exposed to the molten metal. The reaction between one or more of the exposed surfaces and the metal may be so severe as to result in defects which render a casting unsuitable for its intended purpose. These defects may be the result of a chemical interaction between the metal and the surface or due to migration of elements from the metal to the exposed surface. The articles having surfaces which are exposed to the molten metal include ladle liners, crucibles, molds, filters and cores.

During the casting of single crystal, polycrystalline, and directionally solidified blades and vanes, the molten metal is exposed to surfaces on a core disposed in a mold. During casting, reactions tend to occur between the ceramic core material and the superalloy metal. These reactions can be particularly severe when the metal is a nickel-chrome superalloy containing yttrium, such as GE N5 and N6, and PWA 1487.

During the casting of nickel-chrome superalloys containing yttrium, silica cores cannot be used due to their reactivity and inability to withstand the 1,500°–1,600° C. casting temperatures. Although alumina cores are dimensionally stable at these temperatures, they tend to react with components of the superalloy and lead to castings with poor air flow characteristics and poor structural integrity. Thus, when a nickel-chrome superalloy containing yttrium is cast with an alumina core, reactions occur which tend to promote migration of the yttrium from the molten metal to the core body and forms a reaction layer between the core and the metal upon solidification.

SUMMARY OF THE INVENTION

The present invention relates to an article surface, for example, a core surface, which is exposed to a reactive metal during casting of the reactive metal. The article surface is formed from a ceramic material which, prior to sintering, includes yttrium aluminate and alumina ($Al_2O_3$). The ceramic material advantageously contains between 10% and 40% yttrium aluminate. The yttrium aluminate has a mean particle size of less than 20 microns prior to sintering and preferably has a mean particle size less than 10 microns. It has been found to be particularly advantageous to use yttrium aluminate having a mean particle size of approximately 3 microns.

During forming of the core or other article having a surface which is exposed to reactive metal during casting, a binder and the ceramic material which contains yttrium aluminate and alumina are mixed to form a compact. Thereafter, at least a portion of the binder is removed by exposing the compact to water. The compact is then sintered. During sintering, the yttrium aluminate and the alumina interact to yield a ceramic body which subsequently prevents reactions from occurring between the resulting ceramic surface and a reactive metal.

BRIEF DESCRIPTION OF THE DRAWINGS

The foregoing and other features of the present invention will become more apparent upon a consideration of the following description taken in connection with the accompanying drawings, wherein.

DESCRIPTION OF SPECIFIC PREFERRED EMBODIMENTS OF THE INVENTION

General Description

Figure 1:
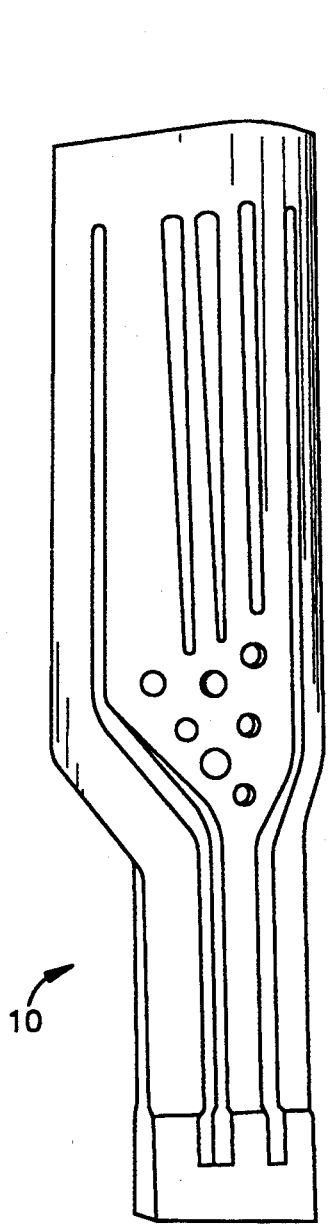
FIG. 1 is a schematic illustration of a typical core which may be used to form internal passageways in a blade during casting of the blade.

During the casting of reactive metals, surfaces on ladle liners, crucibles, molds, filters and cores are exposed to the reactive metal. Due to reactions between one or more of the surfaces and the metal, there can be an uneven distribution of alloy components in the solidified cast metal. In addition, reactions between the surfaces and the alloy can result in the formation of defects in the cast metal. Among the well known reactive metals are nickel-chrome superalloys, titanium and titanium alloys, zirconium and zirconium alloys and high carbon steels. Alloys containing substantial amounts of tungsten, hafnium, carbon, nickel, cobalt, etc. tend to react with surfaces to which they are exposed during casting.

Blades and vanes used in jet engines are commonly cast with a superalloy, such as GE N5 and N6, and PWA 1487, which contain yttrium. During the casting of these blades or vanes, ceramic cores are used to form internal passageways required for air to cool the blade or vane. Thus, the superalloy is cast around the core which is subsequently leached out of the casting in a caustic solution.

The use of silica cores is prohibited due to the reactivity and inability of the silica material of the core to withstand the 1,500°–1,650° C. temperatures at which these castings are typically made. Alumina cores have been found to be dimensionally stable at these temperatures. However, alumina cores tend to react with components of the superalloy, particularly when the superalloy contains yttrium. The reaction of the yttrium with the alumina core tends to cause a depletion and uneven distribution of yttrium in the cast metal and to result in other defects in the cast metal, such as a reaction layer.

In accordance with a feature of the present invention, a ceramic core or other surface for use in casting a reactive metal is formed from a ceramic material which, prior to sintering, contains yttrium aluminate and alumina ($Al_2O_3$). By forming the core from pre-reacted yttrium aluminate particles and alumina particles, reactions between the molten superalloy containing yttrium and the core are minimized. In addition, there is a relatively even distribution of yttrium in the cast metal.

Core Formation

A ceramic core 10 (FIG. 1) constructed in accordance with the present invention is formed by mixing a ceramic material with a binder. The resulting mixture is injection molded to form a compact having a configuration corresponding to the desired configuration of the core. This compact is then sintered to form the core 10.

During formation of the core 10, the ceramic material of the present invention and a binder or carrier are mixed. Although many different binders could be used, it is preferred to use a binder which includes a water soluble component and a water insoluble component. The water soluble and water insoluble components of the binder are completely miscible in each other when they are in a liquid state. This enables the components of the binder to be mixed with relatively little energy to form a uniform heterogeneous mixture.

The water soluble component of the binder includes at least one hydrophilic functional group and has a molecular weight which is under 10,000. The water insoluble component of the binder is a polymer having hydroxyl groups copolymerized with non-polar diluents to such an extent as to be insoluble with a water-based media. The water soluble component and water insoluble component of the binder may initially be powders which are heated to change them from their solid state to their liquid states.

In one specific instance, the binder was 50% by weight of the water soluble component and 50% by weight of the water insoluble component. The water soluble component was polyethylene glycol having an average molecular weight of 3,350. The water insoluble component was a polyacetal copolymer. Although this specific binder is preferred, binders having a different composition could be used if desired.

The liquid heterogeneous mixture of water soluble and water insoluble components of the binder are mixed with the ceramic powder of the present invention. The powder may be coated with a dispersant, lubricant, and/or surfactant, to form a substantially uniform feedstock. The mixing of the binder with the ceramic powder may occur at elevated temperatures in a sigma blade mixer. Therefore, during mixing of the ceramic powder of the present invention, the binder has a relatively low viscosity. The substantially uniform mixture of binder and powder forms a feedstock.

The feedstock is injection molded into dies to form a compact. The feedstock is molded to a configuration which is a function of the configuration of the core 10 (FIG. 1). However, the feedstock may be molded into a die to form a compact having any desired configuration.

It is preferred to at least partially remove the binder from the compact before sintering the compact. Thus, there is a partial debinding of the compact by removing at least a portion of the water soluble component of the binder. This is accomplished by exposing the compact to a water-based solvent which removes at least 80% of the water soluble component of the binder.

When sufficient debinding of the compact has been accomplished to remove a desired amount of the water soluble component of the binder, the compact is withdrawn from exposure to the water. The compact is then slowly dried in a moisture rich atmosphere.

After the water soluble component of the binder has been at least partially removed from the compact and the compact has been slowly dried, the water insoluble component of the binder and any remaining portion of the water soluble component are removed. This may be accomplished by heating the compact to a temperature above 1,000° F. in a suitable oven or furnace.

After removal of the water soluble and water insoluble components of the binder, the powder particles of the ceramic material of the present invention are mechanically held together. The compact is then sintered in a suitable furnace to bond the powder particles of the ceramic material together. Thus, the sintered particles of ceramic material are interconnected by cohesive necks and/or weld bonds between the powder particles of the ceramic material. The compact is typically sintered at a temperature of approximately 1,500° to 1,650° C.

The manner in which the binder and improved ceramic material of the present invention cooperate with each other is the same as is disclosed in U.S. patent application Ser. No. 07/991,990 filed Dec. 17, 1992 by Karl F. Hens et al. and entitled "Method and Binder for Use in Powder Molding". The disclosure in the aforementioned application is to be considered as being incorporated herein in its entirety to the extent applicable, by this reference thereto.

Ceramic Material

The improved ceramic material of the present invention contains yttrium aluminate and alumina ($Al_2O_3$). The yttrium aluminate particles consist of a stoichiometric mixture of yttria ($Y_2O_3$) and alumina ($Al_2O_3$) powders that are prereacted by methods such as fuse casting or sintering. The pre-reacted yttrium aluminate particles are $3Y_2O_3 \cdot 5Al_2O_3$, $2Y_2O_3 \cdot Al_2O_3$, or $Y_2O_3 \cdot Al_2O_3$ or mixtures thereof. The yttrium aluminate particles may be in the form of yttrium aluminum garnet (YAG), if desired. If desired, non-yttrium bearing rare earth such as cerium oxide, lanthanum oxide or neodymium oxide blended with alumina particles could be used.

The pre-reacted yttrium aluminate particles have a mean particle size which is less than 20 microns prior to sintering of the compact. It is preferred to have a yttrium aluminate mean particle size of less than 10 microns prior to sintering. It is believed that the best results are obtained when the yttrium aluminate has a mean particle size of approximately 3 microns prior to sintering.

The pre-reacted yttrium aluminate particles are mixed with particles of alumina ($Al_2O_3$). The mixture of yttrium aluminate and alumina may range from 10% to 40% yttrium aluminate and 90% to 60% alumina by weight. In one specific instance, approximately 25% of the alumina particles were of the 3 micron mean particle size while approximately 75% of the alumina particles were of the 40 micron mean particle size. Of course, other sizes and ratios of alumina particles could be used if desired.

The yttrium aluminate particles and alumina particles were mixed in a V-blender having an intensifier bar. Thus, prior to sintering, yttrium aluminate particles and alumina particles were mixed to form a blend. The ceramic blend was mixed with a binder. The binder and the ceramic particles were then processed in the manner previously explained to form a compact which was sintered. During sintering, the yttrium aluminate particles and alumina particles became interconnected to form the core 10.

After the core 10 had been formed, the core was placed in a mold cavity. A molten reactive metal, specifically a superalloy containing yttrium, was conducted into the mold cavity. During solidification of the yttrium bearing superalloy in the mold cavity, there was very little reaction between the core material and the molten metal. It was found that the resulting cast article had a relatively even distribution of yttrium throughout the article.

Examples

In order to confirm the improved characteristics of a core formed with the improved ceramic material, comparisons were made with known core materials. Thus, four cores formed of two different known core materials were used during the casting of a nickel-chrome superalloy containing yttrium, specifically GE N5. In addition, six cores containing the improved ceramic material of the present invention were used to cast articles of the same reactive molten metal. The cores which were formed from the improved ceramic material of the present invention had fewer core metal reaction sites than the cores which were formed from the known core materials. In addition, there was an improved distribution of yttrium in the cast article when the cores formed of the ceramic material of the present invention were used.

The following is a Table indicating the results of the tests on the ten different specimens which were all cast of the same metal, that is, GE RENE N5.

TABLE

Figure 2:
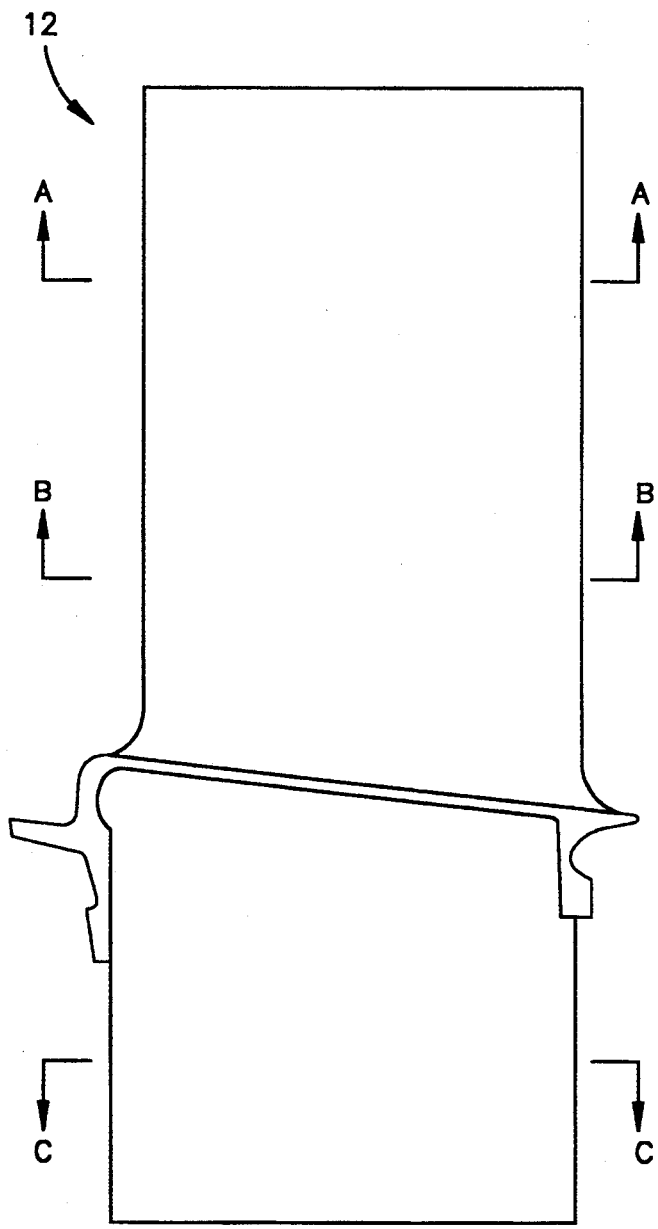
FIG. 2 is a schematic illustration of a typical blade cast of a reactive metal with the core of FIG. 1.

| Specimen | Section (FIG. 2) | Number of Core Metal Reaction (CMR) Sites >1.5 Mils in Depth | | Maximum CMR Depth (mils) | Core Composition |
|---|---|---|---|---|---|
| 1. | A | 46 | ⎫ | 2.5 | Alumina |
|    | B | 56 | ⎬ 115 | 2.5 | (Al$_2$O$_3$) |
|    | C | 13 | ⎭ | 3.0 | |
| 2. | A | 13 | ⎫ | 2.5 | Alumina |
|    | B | 26 | ⎬ 80 | 2.5 | (Al$_2$O$_3$) |
|    | C | 41 | ⎭ | 2.5 | |
| 3. | A | 12 | ⎫ | 2.5 | Yttria and |
|    | B | 12 | ⎬ 29 | 2.5 | Alumina |
|    | C | 5  | ⎭ | 2.5 | Y$_2$O$_3$ + Al$_2$O$_3$ |
| 4. | A | 10 | ⎫ | 2.0 | Yttria and |
|    | B | 9  | ⎬ 19 | 2.0 | Alumina |
|    | C | 0  | ⎭ | 0   | Y$_2$O$_3$ + Al$_2$O$_3$ |
| 5. | A | 11 | ⎫ | 2.0 | 10% Yttrium |
|    | B | 8  | ⎬ 20 | 2.0 | Aluminate |
|    | C | 1  | ⎭ | 2.0 | (3 micron) 90% Alumina |
| 6. | A | 7  | ⎫ | 2.0 | 10% Yttrium |
|    | B | 5  | ⎬ 13 | 2.5 | Aluminate |
|    | C | 1  | ⎭ | 2.0 | (15 micron) 90% Alumina |
| 7. | A | 1  | ⎫ | 2.0 | 20% Yttrium |
|    | B | 9  | ⎬ 10 | 2.5 | Aluminate |
|    | C | 0  | ⎭ | 0   | (15 micron) 80% Alumina |
| 8. | A | 2  | ⎫ | 2.0 | 20% Yttrium |
|    | B | 3  | ⎬ 5  | 2.0 | Aluminate |
|    | C | 0  | ⎭ | 0   | (15 micron) 80% Alumina |
| 9. | A | 0  | ⎫ | 0   | 20% Yttrium |
|    | B | 2  | ⎬ 2  | 2.0 | Aluminate |
|    | C | 0  | ⎭ | 0   | (3 micron) 80% Alumina |
| 10.| A | 1  | ⎫ | 2.0 | 20% Yttrium |
|    | B | 0  | ⎬ 1  | 0   | Aluminate |
|    | C | 0  | ⎭ | 0   | (3 micron) 80% Alumina |

The first two specimens, that is specimens 1 and 2 on the Table, were cast with cores formed of alumina (Al$_2$O$_3$). The resulting cast blade 12 (FIG. 2) was sectioned and polished at three different locations designated A, B and C in FIG. 2. Using an optical light microscope, core metal reaction (CMR) sites having a size of more than 1.5 mils were counted at each of the sections.

At section A of the first specimen, there were 46 sites of a size of 1.5 mils or greater. At section B of the first specimen, there were 56 sites of a size of 1.5 mils or more. At section C, there were 13 sites of 1.5 mils or more. Thus, there were 115 core metal reaction sites at the three sections of the blades of specimen 1 cast with an alumina core. The maximum depth of the core metal reaction sites was 2.5 mils at sections A and B and 3.0 mils at section C.

The second specimen on the Table was also cast with an alumina core. This specimen had a total of 80 CMR sites at the three sections. The maximum CMR depth was 2.5 mils.

A core formed of yttria and alumina in the manner disclosed in U.S. Pat. No. 4,837,187 issued Jun. 6, 1989 to Frank et al. and entitled "Alumina-Based Core Containing Yttria" was used to form the cores for casting specimens 3 and 4. The third specimen had 29 CMR sites with an average depth of 2.5 mils. The fourth specimen had 19 CMR sites with an average depth of 2.0 mils. Thus, it is believed that the use of a ceramic material formed of yttria and alumina in the manner disclosed in U.S. Pat. No. 4,837,187 may result in the formation of fewer core metal reaction sites.

Specimens 5 through 10 in the Table were cast with cores formed of a ceramic material in accordance with the present invention. Thus, specimen 5 was cast with a core made with a ceramic material consisting of 10% yttrium aluminate and 90% alumina (Al$_2$O$_3$). The yttrium aluminate had a 3 micron mean particle size. When the resulting casting was sectioned at the three locations indicated in FIG. 2 and examined with an optical light microscope, it was found that there was 20 CMR sites and that the sites had a maximum CMR depth of 2.0 mils.

The sixth specimen was cast with a core having the same composition as the core of specimen 5. However, the core of specimen 6 was formed with a ceramic material containing yttrium aluminate with a 15 micron mean particle size. Upon inspection of the resulting casting at the three locations indicated in FIG. 2, it was found that there were 13 core metal reaction sites. It was theorized that the reason specimen 6 had fewer core metal reaction sites than specimen 5 was that the ceramic material which formed the core of specimen 6 contained yttrium aluminate having a 15 micron mean particle size.

Specimens 7 and 8 were both formed with cores having the same composition. Thus, specimens 7 and 8 were formed with cores containing 20% yttrium aluminate having a mean particle size of 15 microns and 80% alumina. Specimens 7 and 8 of the Table were examined with a scanning electron microscope. It should be noted that both relatively large and small yttrium aluminate particles having a light appearance were intermixed with large and small alumina particles, having a dark appearance. In specimen 7 it was found that there was 10 CMR sites, while in specimen 8 it was found that there was only 5 CMR sites. It should be noted that at section C, the relatively thick root portion of the blade, there were no CMR sites.

Specimens 9 and 10 were cast with cores containing 20% yttrium aluminate having a mean particle size, prior to sintering, of 3 microns and 80% alumina. When these specimens were examined with a scanning electron microscope, it was found that the core had relatively small yttrium aluminate particles, having a light appearance, intermixed with relatively large alumina particles, having a relatively dark appearance. It is theorized that the relatively large number of small yttrium aluminate particles around the alumina particles blocked the reactive molten metal from interacting with the alumina particles. With specimen 9, there were only 2 CMR sites at section B of FIG. 2. With specimen 10, there was only 1 CMR site at section A of FIG. 2.

It is not known for certain why the cores of specimens 5 through 10 and particularly the cores of specimens 9 and 10 yielded improved results over the cores of specimens 1 through 4. However, it is theorized that the presence of the inert yttrium aluminate around the alumina eliminates the driving force of the yttrium in the molten metal from migrating into and reacting with the core. However, the exact reason why the improved results is obtained is not fully understood. However, it has been determined that a core which is formed from a ceramic material which, prior to sintering, contains yttrium aluminate and alumina provides an improved result over a core formed of alumina (specimens 1 and 2) or a core formed of a mixture of yttria and alumina (specimens 3 and 4) as the ceramic material.

Conclusion

In view of the foregoing description, it is apparent that the present invention relates to an improved article surface, for example, a core surface, which is exposed to a reactive metal during casting of the reactive metal. The article surface is formed from a ceramic material which, prior to sintering, includes yttrium aluminate and alumina ($Al_2O_3$). The ceramic material advantageously contains between 10% and 40% yttrium aluminate. The yttrium aluminate has a mean particle size of less than 20 microns prior to sintering and preferably has a mean particle size less than 10 microns. It has been found to be particularly advantageous to use yttrium aluminate having a mean particle size of approximately 3 microns.

During forming of the core or other article having a surface which is exposed to reactive metal during casting, a binder and the ceramic material which contains yttrium aluminate and alumina are mixed to form a compact. Thereafter, at least a portion of the binder is removed by exposing the compact to water. The compact is then sintered. During sintering, the yttrium aluminate and the alumina obtain a relationship which subsequently prevents reactions from occurring between the resulting ceramic surface and the reactive metal.

Having described the invention, the following is claimed:

1. A method of forming a surface which is exposed to a reactive metal during casting of the reactive metal, said method comprising the steps of mixing a binder and a ceramic material which contains yttrium aluminate and alumina ($Al_2O_3$), shaping the mixture of binder and ceramic material to form an article, and, thereafter, removing at least a portion of the binder, said step of removing at least a portion of the binder includes exposing the article to water.

2. A method as set forth in claim 1 wherein said step of removing at least a portion of the binder includes heating the article to a temperature above 1,000° F.

3. A method of forming a surface which is exposed to a reactive metal during casting of the reactive metal, said method comprising the steps of mixing a binder and a ceramic material which contains yttrium aluminate and alumina ($Al_2O_3$), shaping the mixture of binder and ceramic material to form an article, thereafter, sintering the article, and removing at least a portion of the binder from the article prior to performing said step of sintering the article, said step of removing at least a portion of the binder includes exposing the article to water.

4. A method of forming a surface which is exposed to a reactive metal during casting of the reactive metal, said method comprising the steps of mixing particles of yttrium aluminate having a mean particle size of less than 20 microns with particles of alumina ($Al_2O_3$) to form a ceramic particle mixture which contains at least 20% yttrium aluminate, mixing a binder with the ceramic particle mixture, shaping the mixture of binder and ceramic particles to form an article, and, thereafter, sintering the article.

5. A method of forming a surface which is exposed to a reactive metal during casting of the reactive metal, said method comprising the steps of reacting yttria and alumina together to form particles of yttrium aluminate, forming a ceramic particle mixture by mixing particles of alumina with the particles of yttrium aluminate formed by the preceding step of reacting yttria and alumina together, shaping the ceramic particle mixture to form an article, and, thereafter, sintering the article.

* * * * *